United States Patent [19]
Duong et al.

[11] Patent Number: 5,479,579
[45] Date of Patent: Dec. 26, 1995

[54] CASCADED VLSI NEURAL NETWORK ARCHITECTURE FOR ON-LINE LEARNING

[75] Inventors: Tuan A. Duong, Pasadena; Taher Daud, Tujunga; Anilkumar P. Thakoor, Covina, all of Calif.

[73] Assignee: The United States of America as represented by the Administrator of the National Aeronautics and Space Administration, Washington, D.C.

[21] Appl. No.: 316,711

[22] Filed: Sep. 22, 1994

Related U.S. Application Data

[63] Continuation of Ser. No. 941,355, Sep. 4, 1992, abandoned.

[51] Int. Cl.$^6$ ........................................... G06F 15/18
[52] U.S. Cl. .................... 395/27; 395/22; 395/24
[58] Field of Search .................... 395/22, 24, 27

[56] References Cited

U.S. PATENT DOCUMENTS

| | | | |
|---|---|---|---|
| 4,639,619 | 1/1987 | Baldwin et al. | 395/27 |
| 4,906,865 | 3/1990 | Holler | 395/27 |
| 4,961,005 | 10/1990 | Salam | 395/24 |
| 4,972,187 | 11/1990 | Wecker | 341/95 |
| 4,994,982 | 2/1991 | Duranton et al. | 395/27 |
| 4,996,648 | 2/1991 | Jourjine | 395/25 |
| 5,004,932 | 4/1991 | Nejime | 326/36 |
| 5,045,713 | 9/1991 | Shima | 395/27 |
| 5,047,655 | 9/1991 | Chambost et al. | 395/24 |
| 5,053,645 | 10/1991 | Harada | 326/35 |
| 5,063,601 | 10/1991 | Hayduk | 395/24 |
| 5,068,662 | 11/1991 | Guddanti et al. | 341/161 |
| 5,095,443 | 3/1992 | Watanabe | 395/11 |
| 5,109,275 | 4/1992 | Naka et al. | 358/518 |

OTHER PUBLICATIONS

An Electrically Trainable Neural Network Jun. 1989 Mark Holler.
Design of parallel hardware neural network system Silvio Eberhardt Jun. 1989.
A Compact and General Purpose Neural Chip with Electrically Programmable Systems May 1990 IEEE.
Implepation of Artificial Neural Networks Using Current Mode Analogue Current Techniques P. K. Houselander Feb. 1989.
A Neural Chips Survey by Tom J. Schwartz, AI Expert, Dec. 1990, pp. 34–39.
Fuzzy/Neural Split–Chip Personality by R. Colin Johnson, Electronics Engineering Times, Apr. 2, 1990.
How Neural Networks Learn From Experience by Geoffrey E. Hinton, Scientific American, Sep. 1992, pp. 145–151.

*Primary Examiner*—Allen R. MacDonald
*Assistant Examiner*—Richemond Dorvil
*Attorney, Agent, or Firm*—John H. Kusmiss; Thomas H. Jones; Guy M. Miller

[57] ABSTRACT

High-speed, analog, fully-parallel and asynchronous building blocks are cascaded for larger sizes and enhanced resolution. A hardware-compatible algorithm permits hardware-in-the-loop learning despite limited weight resolution. A computation-intensive feature classification application has been demonstrated with this flexible hardware and new algorithm at high speed. This result indicates that these building block chips can be embedded as application-specific-coprocessors for solving real-world problems at extremely high data rates.

5 Claims, 10 Drawing Sheets

CASCADED VLSI NEURAL NETWORK ARCHITECTURE FOR ON-LINE LEARNING

This application is a continuation of application Ser. No. 07/941,335, filed Sep. 4, 1992, now abandoned.

ORIGIN OF INVENTION

The invention described herein was made in the performance of work under a NASA contract, and is subject to the provisions of Public Law 96-517 (35 USC 202) in which the Contractor has elected not to retain title.

TECHNICAL FIELD

This invention relates generally to neural network architectures and more specifically to a neural network hardware architecture in which a digital-analog hybrid synapse integrated circuit chip is cascaded with a synapse-neuron composite integrated circuit chip to achieve uniquely high resolution synaptic weights.

BACKGROUND OF THE INVENTION

Neural network architectures typically consist of massively parallel systems of simple computational elements. While software-based implementations are adequate for simulating these nonlinear dynamical systems, the physical realization of the true computational processing power inherent in such architectures can only be unleashed with their hardware implementation. This assumes that the electronic implementation retains the fine grained massive parallelism feature inherent in the model. There are a multitude of hardware approaches currently being taken for the implementation of neural network architectures, and these include: analog approaches; biologically motivated pulse-stream arithmetic approaches; optoelectronic approaches; charge coupled device approaches; and digital approaches.

The application of neural networks to problems that require adaptation (either from example or by self-organization based on the statistics of applied inputs) is among the most interesting uses of neural networks. In either case, a critical issue for any hardware implementation, is the inclusion of either on-chip or chip-in-the-loop learning capabilities based on one or more of the current learning paradigms. Real-time adaptation constraints might even further focus the on-chip learning requirements by specifying a need for the adjustment of the synaptic weights in a fully parallel and asynchronous fashion.

Of the numerous neuromorphic learning paradigms currently available, the broad majority are aimed at supervised learning applications. These range from simple Hebbian models with learning rules that require local connectivity information only, to complex hierarchical structures such as the Adaptive Resonance Theory (ART) model. Intermediate in complexity are algorithms for gradient descent learning that are most commonly applied to feedforward neural networks, and to a lesser extent to fully recurrent networks. These gradient descent algorithms are used to train networks from examples. Whether used for implementing a classification problem or a conformal mapping from one multidimensional space into another, adaptation involves selecting an appropriate set of input and output training vectors. Common to any supervised learning paradigm, training is achieved by applying an input to the network and calculating the error between the actual output and the desired target quantity. This error is used to modify the network weights in such a way that the actual output is driven toward the target. What differentiate models are the actual network topologies and the mathematical learning formalisms.

LEARNING HARDWARE ISSUES

While numerous learning methods exist for software based neural network simulators, the same is not true for hardware. There are several reasons for this. Most importantly, the majority of neural learning algorithms are formulated for software implementations. They are based on mathematical expressions and formalisms which cannot be easily adapted to analog hardware and furthermore, they implicitly assume that the available synaptic dynamic range is from 32 to 64 bits of precision. This is in contrast to analog hardware, where 12 bits or more of resolution is pushing the technology. For example, let us consider the feedforward architecture with the backpropagation gradient descent learning scheme for weight adaptation. The calculation of the incremental weights requires not only knowledge of local synaptic weight values, but also the computation of the derivative of the activation function, and the knowledge of the network connectivity information. For on-chip hardware learning, synaptic weights must be stored locally. This can be achieved, for example, with a capacitor where the synaptic weight is proportional to the charge on a capacitor. The calculation of the derivative is more complicated. One possible scheme for doing it is to perturb the input signal to the neuron with a very weak signal and calculate the ratio of the output to input signal differences. This quantity would be proportional to the derivative. As can be surmised, the complexity of the electronics rapidly scales up. There is, however, an additional problem of tremendous importance that is not at all related to clever circuit designs, but rather tests the limits of the analog implementation medium. Because the incremental weight updates in gradient descent-based learning are often exceedingly small quantities, a large dynamic range is required of the synaptic weights. Unpublished results have suggested that up to 16 bits of quantization are typically required for the successful hardware implementation for the popular backpropagation learning algorithm. This is considerably higher than the range obtained from analog fully parallel implementations to date. Learning with less synaptic weight precision leads to oscillations and instability. Currently, 11 bits of resolution have been achieved with the synapse chips implemented by the inventors herein.

Due to the difficulties of implementing learning in hardware, a number of methods have been developed that use a host computer to perform portions of the learning process. Firstly, it is possible to train the network in simulation and then download the resulting weights into a feedforward 'production' network. While this method results in uncompensated errors as a result of mismatches between the simulated and actual circuits, it may only be useful for very small neural networks. This is especially true if the simulation incorporates a first-order characterization of the hardware. Secondly, hardware-in-the-loop learning is a method for taking into account all time-independent errors in a neural network. Learning is controlled by the host computer, but the hardware is exercised as a part of the learning cycle. The hardware is considered as a 'black box' with both input and output channels of analog data, and of which only adjustable parameters are the synaptic weights. In response to an input prompt vector, the output vector can be made to swing to a specified value by suitable fine adjustment of the internal weight parameters. The effect of weight changes can then be measured experimentally a posterjori, i.e., by applying an input and measuring the output. The objective then is to seek incremental weight changes that cause the output to approach the target. Finally, both methods may be combined. An initial weight set is calculated by simulation and can be downloaded into the hardware. This is followed by chip-in-the-loop learning to compensate for differences between the simulation and the actual hardware. This approach has been pursued to train the ETANN chip (manufactured by Intel) to identify upper and lower case characters and numerals in two different typefaces and in two different font sizes.

Historically, the first hardware implementations of neural systems using discrete component neurons and synapses were the Adaline and Madaline disclosed by Bernard Widrow. (See for example, "Generalization and Information Storage In Networks Of Adaline Neurons", Spartan Books, 1962). These systems utilized programmable electrochemical weight elements in a variety of applications including pattern recognition and broom balancing. These network architectures were extremely simple topologically and could contain as few as a single neuron. They were capable of real-world applications in adaptive filtering and adaptive signal processing.

The first analog single chip learning machine was the stochastic Boltzmann machine of Joshua Alspector et al. ("Performance of a Stochastic Learning Microchip", Vol. 1, Morgan Kaufmann Publishers, 1989). This machine utilized 6 analog neurons, 15 bidirectional 5-bit multiplying digital-to-analog converter (MDAC) synapses, and variable amplitude noise sources. The system incorporated digital counters and analog noise to determine correlations between the two neurons that the synapse connects, both when the neurons were clamped during training and when allowed to run freely during production. If the neuron states were correlated during training but not during production, the connecting synapse weight was incremented; if the opposite was true, the synapse weight was decremented. The training circuitry was essentially digital, with highly quantized weights. Up to a few hundred training cycles were required for correct classification. One of the difficulties with this chip was that the analog noise sources became correlated, confounding controlled annealing. In recent work, a digital pseudorandom shift register with multiple taps was used to obtain multiple noise sources that were uncorrelated over short windows of time.

To date, there have been a multitude of approaches to the hardware implementation of neuromorphic architecture. An objective leading to development of the present invention has been to take an analog CMOS 'building block' modular approach capable of building moderate-sized networks with up to a few hundred neurons and several thousand synapses total and implement chip-in-the-loop learning.

The following U.S. patents and publications are relevant to the present invention:
4,961,005 Salam
4,994,982 Duranton et al
5,004,932 Nejime
5,053,645 Harada
5,068,662 Guddanti et al
5,109,275 Naka et al
4,972,187 Wecker
4,996,648 Jourjine
5,047,655 Chambost et al
5,063,601 Hayduk
5,095,443 Watanabe Publication entitled "Fuzzy/Neural Split-Chip Personality" Electronic Engineering Times, Apr. 2, 1990; and Publication entitled "A Neural Chips Survey", AI Expert, December 1990.

STATEMENT OF THE INVENTION

The present invention comprises a variety of hardware neural network building block chips fabricated with $2\mu$ CMOS technology. The cascadable and stackable building block chips are fully parallel and reconfigurable and therefore offer high speed. Furthermore, the synaptic memory is based on SRAM design and unlike capacitive synapses does not require refresh circuitry overhead. Disclosed herein are a synaptic array chip and a neuron-synapse composite array chip which have been successfully applied to solve a range of data classification and optimization problems. These problems often require higher resolution synapses and/or a larger network. The disclosed cascadable and stackable chips are therefore quite well-suited for such applications. Iterative learning techniques, such as gradient descent, have been developed primarily for fixed neural architectures. On the other hand, the Cascade Correlation (CC) algorithm described by Eberhardt, Duong and Thakoor in an article entitled "Design Of Parallel Hardware Neural Network Systems From Custom Analog VLSI Building Block Chips", Proc. of JJCNH, 1989, overcomes the problem of specifying a priori the number of hidden neurons. The present invention further modifies the CC algorithm into a hardware implementable "Cascade Backpropagation" and its embodiment has been applied to solving real problems. There are two types of building block chips disclosed herein: synapse chips and neuron-synapse chips. The synapse chip contains a 32×32 crossbar array of synapse cells in which each cell consists of these three blocks: V-I convertor; 6-bit digital-to-analog convertor; and a current steering circuit to provide the sign bit.

The neuron-synapse chip also has a 32×32 synapse array in which one diagonal of synapses is replaced by 32 neurons having full connectivity. Each neuron, through three circuit functions (comparator, I–V convertor, and gain controller), performs a nonlinear (sigmoidal) transformation on its input current and produces a corresponding voltage as output.

A fully-connected network with 64 neurons is obtained by cascading two synapse and two neuron-synapse chips. Furthermore, by paralleling these four chips with four additional synaptic chips (in effect paralleling each synapse of one chip with a respective synapse on the other) and setting chip gain levels accordingly, the effective dynamic range of weights was increased to 11 bits. In stacking two chips, one may be referred to as a high-order bit chip (HOB), and the other, a low-order bit chip (LOB). With the same input voltage applied to both the LOB and HOB cells, the biases are adjusted such that the LOB cell current is 64 times less than the current input at the HOB cell. This would provide a nominal synapse resolution of 14 bits, but the transistor mismatches and processing variation restrict the resolution to around 11 bits. The 11-bit resolution is a requirement for hardware-in-the-loop learning using Cascade Backpropagation.

By setting feedback weights to zero, a feedforward architecture was mapped onto this system of eight cascaded neurochips. A new resource-allocating learning algorithm (Cascade Backpropagation) was used that combines Backpropagation with elements of Cascade Correlation. This new algorithm starts with a single layer perceptron, wherein pseudo-inverse calculated weights are downloaded and are then frozen. Neurons are added as hidden units one at a time to learn the required input to output. The added neuron weights are computed using a gradient-descent technique. A host computer sends the input to the network and reads the hidden unit and the output neuron outputs. Perturbing the bias weights to find the change of outputs determines the derivatives of the hidden neuron and output neuron transfer curve. With the input, hidden and output neuron outputs, their derivatives, and the differences of actual and target outputs determined, the change of weights can now be calculated and effected through the software. The iterative process is repeated until the learning saturates (no change in output) or an iteration limit is reached. The weights are then frozen and a new hidden unit is added to continue the learning process. The learning process is ended when the desired degree of tolerance between target and actual output is reached.

It is therefore a principal object of the present invention to provide a hardware implemented, on-line learning neuroprocessor having cascaded integrated circuit chips to provide extremely high electronic synaptic weight resolution, combined with a new learning algorithm and a hardware design that offers reconfigurability, cascadability and high resolution for on-line learning.

It is another object of the invention to provide a high-resolution neuroprocessor architecture in which a fully connected synapse-neuron chip is cascaded with synaptic chips to obtain larger-size networks for on-line learning.

It is still an additional object of the invention to provide a cascaded neuroprocessor system (both a lateral cascading to obtain larger-size networks and a piggyback synaptic connectivity to obtain higher bit resolutions) in which on-line learning is made possible by the achievement of 11 or 12 bit resolution in electronic synaptic weights.

Many of the terms and general concepts described herein may be better understood by referring to an article entitled "How Neural Networks Learn From Experience" by Geoffrey E. Hinton, Scientific American, Volume 267, Number 3, September 1992, pages 145–151.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Building Block Hardware Modules

Analog hardware systems have reemerged as an important class of computing devices. There are several reasons for this. Perhaps the most exciting reason is that one can fabricate large-scale analog VLSI circuits that are capable of implementing the fully parallel architecture of neural networks, thereby exploiting their inherently high speed processing capabilities. A further advantage of analog technology over digital technology is in the tremendous simplification of circuitry associated with the exploitation of the physics of the device and the consequent savings in the VLSI real-estate. For example, the neuronal function of aggregating the post-synaptic excitatory/inhibitory outputs and summing them prior to the application of the neuron's nonlinearity is achieved in the analog domain with a bare wire. The same function can be achieved in the digital domain by using large functional blocks such as registers and accumulators and the corresponding software protocol.

Figure 1:
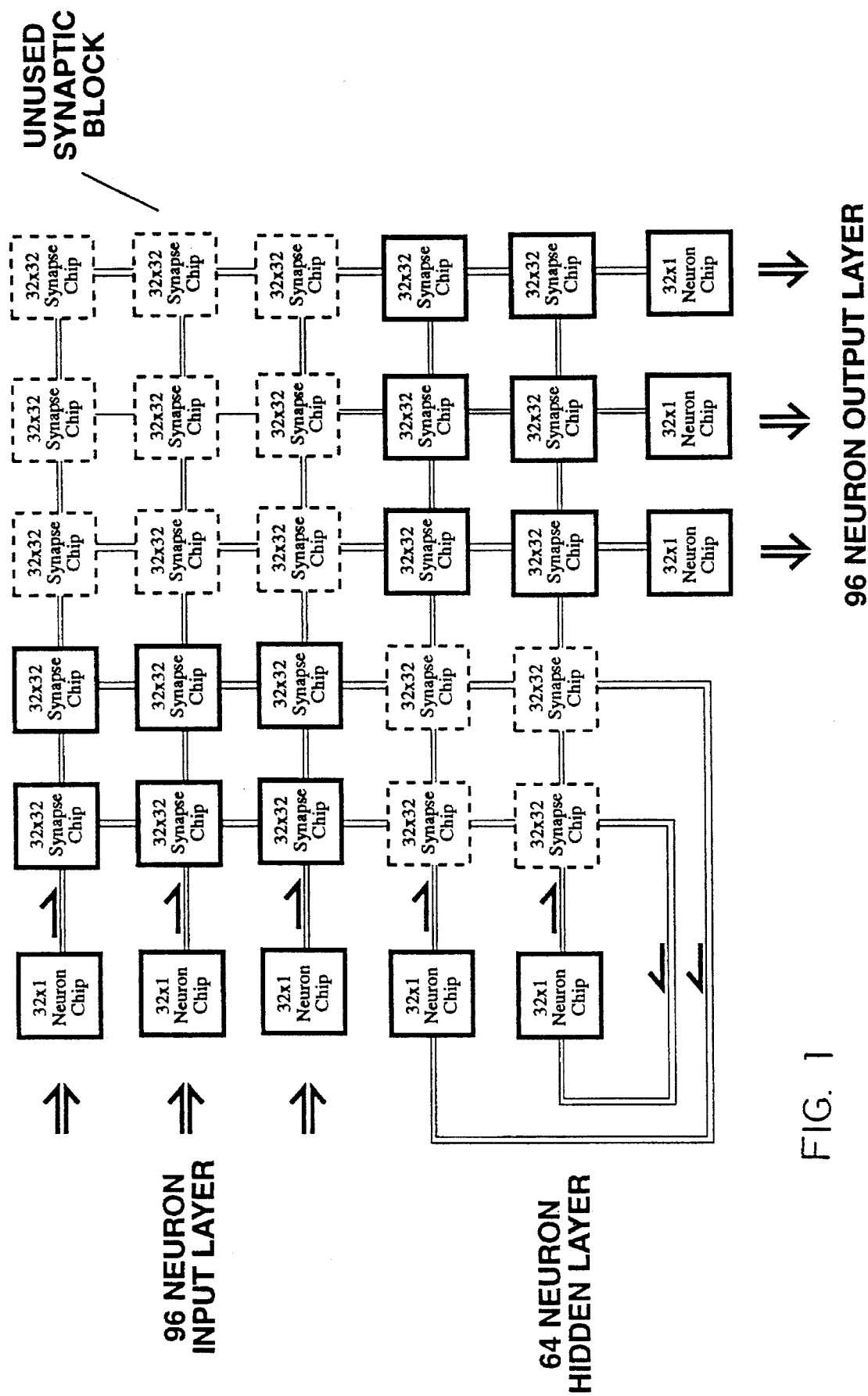
FIG. 1 is a block diagram illustrating the building block approach to neuroprocessors.

The general philosophy behind the present invention has been to synthesize large-scale analog neural network systems from a library of VLSI 'building block' chips. These chips should be capable of being cascaded, so that it should be possible to directly connect synapse inputs as well as outputs. This implies that input values should be encoded as voltages, because voltage replication can be performed by one wire. The output values, however, must be encoded as currents, since synapse outputs must be summed and current summation can likewise be performed by using just a bare wire. It should be noted that this sum requires normalization and that the scaling factor cannot be known in advance in the building block paradigm. Consequently, it is necessary for the neuron circuit to be capable of programmable gain variation. Such chips can be cascaded to form networks of arbitrary size and connectivity. By selectively externally wiring chip outputs to corresponding chip inputs, feedforward, feedback, or a combination of neural network architectures can be carved out. This concept for a general purpose neuroprocessor is shown schematically in FIG. 1.

It is important to note that very few methods exist for implementing analog memories in standard CMOS VLSI. The most obvious is to store the values as digital words, and use a digital-to-analog converter. The drawback of this approach is that the synapse cell size is too small to implement a high-precision digital-to-analog converter. One must be content with 5–7 bits of resolution accuracy. A second approach is to store the weights as charges on small on-chip capacitors and serially refresh these analog charges by an external download interface circuit. This interface circuit stores the weights in digital form in a random access memory (RAM) and invisibly refreshes the synapse. This design offers about 10-bits of resolution and meets most requirements. Its major drawback is the associated extensive download/refresh circuitry. Both of the above approaches are volatile in nature. Another approach taken for a synapse chip, addresses the volatility problem by storing charge in a nonvolatile fashion on a transistor's floating gate using ultraviolet (UV) radiation. This design significantly reduces the complexity of the download interface and offers long-term nonvolatile storage of weights. However, weight writing is a very slow process and the bit resolution obtained is much lower (5 to 6 bits).

Multiplying Digital-To-Analog Converter Synapse Chip

The simplest method for implementing synapses in hardware is based on a hybrid digital-analog design which can be easily implemented in CMOS with a straightforward digital interface and analog circuit. The hybrid design utilizes digital memories to store the synaptic weights and digital-to-analog converters to perform the analog multiplication. This synapse design is organized as a 32×32 cross-bar array of synaptic cells and constructed through MOSIS using 2µ feature sizes. The basic design and operational characteristics of the synapse chip are described as follows. Although earlier versions of the MDAC cell exist with less dynamic range, the synaptic cell described in this implementation consists of a 7-bit static latch and a 6-bit two-quadrant multiplying digital-to-analog converter (MDAC) along with current steering to provide the sign bit.

Figure 2:
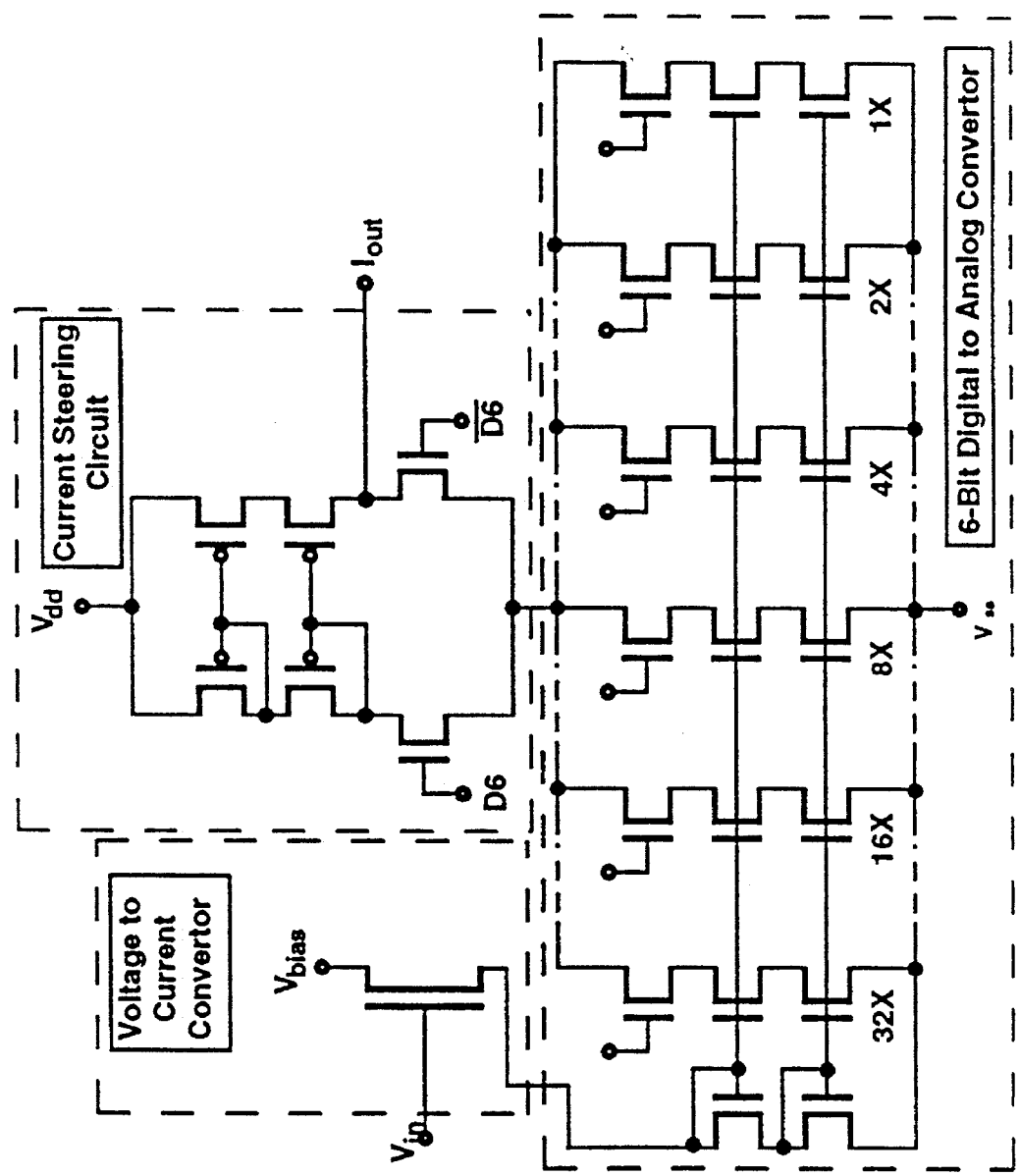
FIG. 2 is a schematic illustration of a multiplying digital-to-analog converter synapse chip cell showing binary coded current sources.

A circuit schematic of the 7-bit DAC is shown in FIG. 2. The MDAC consists of a current input circuit, a set of binary weighted current sources with selecting switches $D_0$ to $D_5$, and a current steering circuit with selecting switch $D_6$ ($\overline{D_6}$). In operation, the externally generated input current is mirrored at each of the binary weighed current sources in the synaptic cell. Although a single FET transistor could have been used to convert the synapse input voltage into a current, we have preferred to employ an external resistor for this conversion. This results in a highly desirable linearity in the synaptic transfer characteristic.

For each synaptic cell in the MDAC array, the expression for the current $I_{OUT}$ flowing out of the cell as a function of the input current $I_{IN}$ (given a specific state of the latch) is given as follows. Recall that the current from each of the binary weighed current sources, $I_i$, is given by the quantity:

$$I_i 2^i I_{IN}(D_i)$$

where ($D_i$) gives the state of the switch $D_i$ and is either 1 or 0, i.e., either ON or OFF. The total current from the 7-bit static latch is then given by $$I_{OUT} = (D_6 : \overline{D_6}) \sum_{i=0}^{5} I_i$$

where $D_6 : \overline{D_6}$ determines the excitatory or inhibitory configuration of the synaptic cell, and is either 1 or −1.

Figure 3:
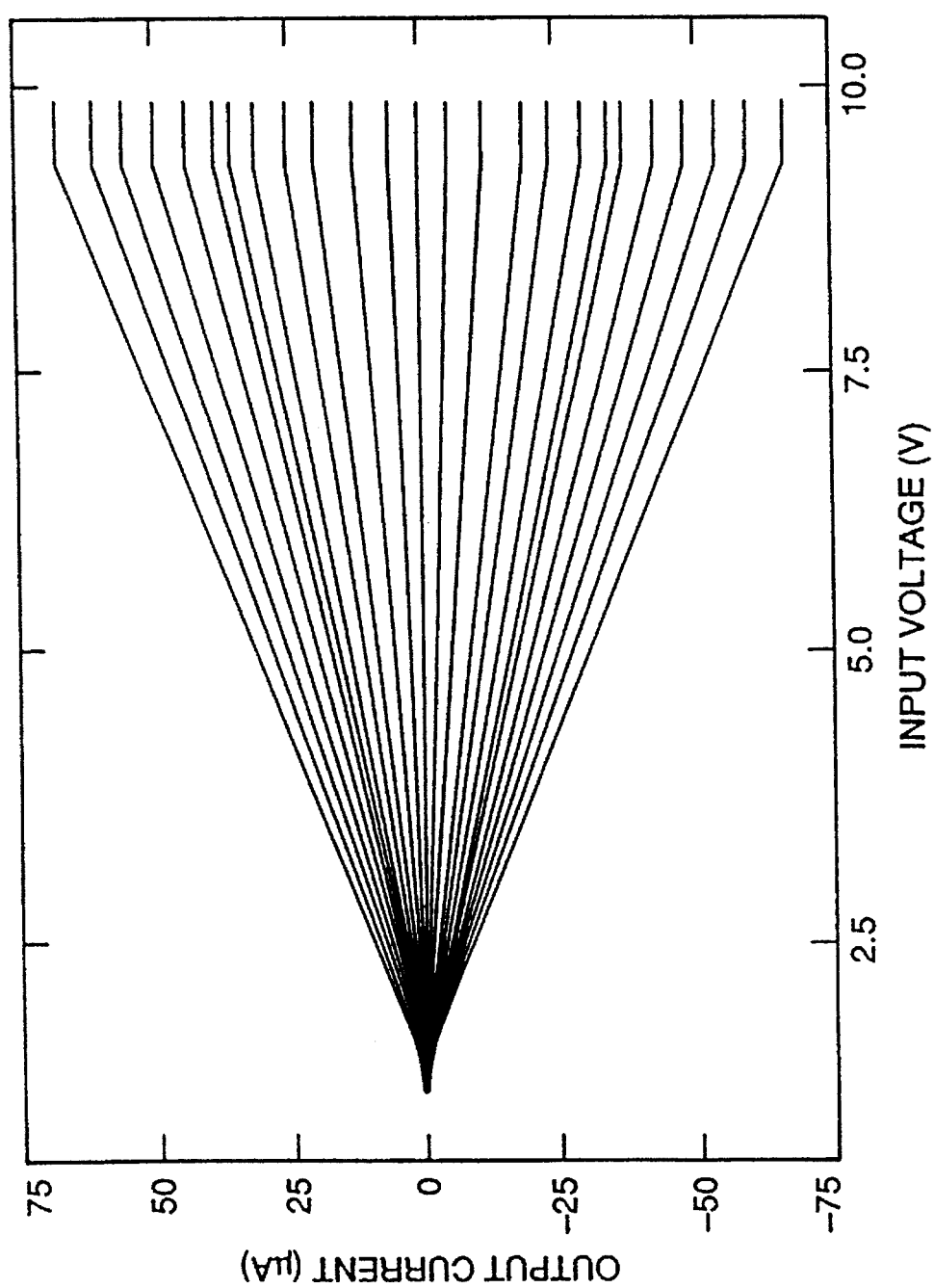
FIG. 3 is a graphical illustration of the transfer characteristic of the cell of FIG. 2.

Typical measured synapse response (I–V) curves for these hybrid 32×32×7-bit chips are shown in FIG. 3 for 25 weight values evenly spread over the full weight range of (±63) levels of quantization. The curves in FIG. 3 were obtained using an external 10-megaOhm resistor for the I–V conversion. For input voltages greater than about twice the transistor's threshold voltage (−0.8 v), the synapse's current output is a highly linear function of the input voltage.

The synapse also exhibited excellent monotonicity and step size consistency. Based on a random sampling of synapses from several chips, the step size standard deviation due to mismatched transistor characteristics is typically less than 25%.

A variation of this MDAC chip which was also fabricated, incorporates 32 neurons physically and electrically on the same chip. To achieve this, the 32×32 cross-bar synaptic matrix was modified to physically locate the neurons along one of the diagonals, and 32×31 synapses at the nondiagonal nodes of the matrix.

HARDWARE LEARNING SYSTEMS (FEEDFORWARD NETWORKS)

Dynamically Reconfigurable Neural Networks

In selecting a neural network architecture, it has been shown that careful thought must be given to matching a network topology to the given problem. In fixed-topology neural networks, the allocation of too few neurons can lead to poor memorization, and the allocation of too many neurons can lead to poor generalization.

There exists a novel class of neural network architectures that address this problem by permitting the assignment of new computational elements, i.e., neurons and associated synapses, to a given architecture on the basis of the difficulty of learning a given problem's complexity. In prior models, the network's architecture was determined a priori on empirical or heuristic grounds and consequently frozen prior to training. Three such new architectures include the Resource Allocating Neural Network (RANN) of John Platt (See Neural Computation, 3(2), 1991), the Cascade-Correlation Neural Network (CCNN) of Scott Fahlman et al (See Neural Information Processing Systems, 1990) and the Cascade-Backpropagation Neural Network (CBNN) of Tuan Duong a coinventor herein. All three architectures are characterized by the dynamic assignment of neurons in a non-topology static network with the specific goal of reducing the network's training time. The speed-up in learning is a consequence of the following three reasons. Firstly, all three architectures select a minimum network topology prior to training that meets the posed problem's input and output requirements. Secondly, once training is initiated, new neurons are dynamically inserted into the architecture based on performance optimization. This means that the network will attempt to learn the input-output transformation (via a learning algorithm such as gradient descent) with its initial network configuration and if necessary assign new neurons to the architecture in order to minimize the error below some minimum acceptable tolerance requirement. Lastly, when presented with new external stimuli, these networks can learn to provide the desired response without the need for retraining the entire network and consequently destroying past learning. The techniques for achieving these desired results vary from model to model.

In the 2-layer RANN architecture, Platt makes use of Gaussian transfer functions for the neurons having parameters, i.e., center, height and width, which are locally tunable. These neurons have local response functions, and depending on the Gaussian's full-width-at-half-maximum, the neurons can be made to respond to input values ranging from a delta neighborhood away from the Gaussian's center all the way to all values. It is because the neurons respond to only a small region of the space of input values that newly allocated neurons do not interfere with previously allocated neurons. This network architecture is currently being implemented in analog VLSI CMOS hardware.

The CCNN and CBNN architectures differ from the RANN architecture in that they make use of the standard neuron transfer function with the sigmoid activation response, among other things. In both the CCNN and CBNN, the learning algorithm initializes the network with a minimalist architecture based solely on the interface requirements to the external world, i.e., the number of input and output units. At this stage, the network topology does not contain any hidden units.

The distinctions between the CCNN and CBNN models come about in both the training methodologies used as well as the subset of synapses that are subsequently trained after each new neuron allocation. Both algorithms assign hidden units one at a time to the network topology. Each new hidden unit receives a connection from each of the network's original inputs and also from every pre-existing hidden unit. In the case of the CCNN, the outputs from these new neurons are not connected to the network's output neurons initially. The training algorithm then relies on adjusting the input weights to maximize the correlation between the neuron's input and the residual network error. When the correlation score reaches a plateau, the hidden unit's input weights are frozen and the unit is added to the network. The next stage is to retrain all the weights going to the output units, including those from the new hidden unit. Each new unit therefore adds a new one-unit layer to the network. This algorithm typically leads to multiple layers of hidden units and consequently very deep architectures.

Figure 4:
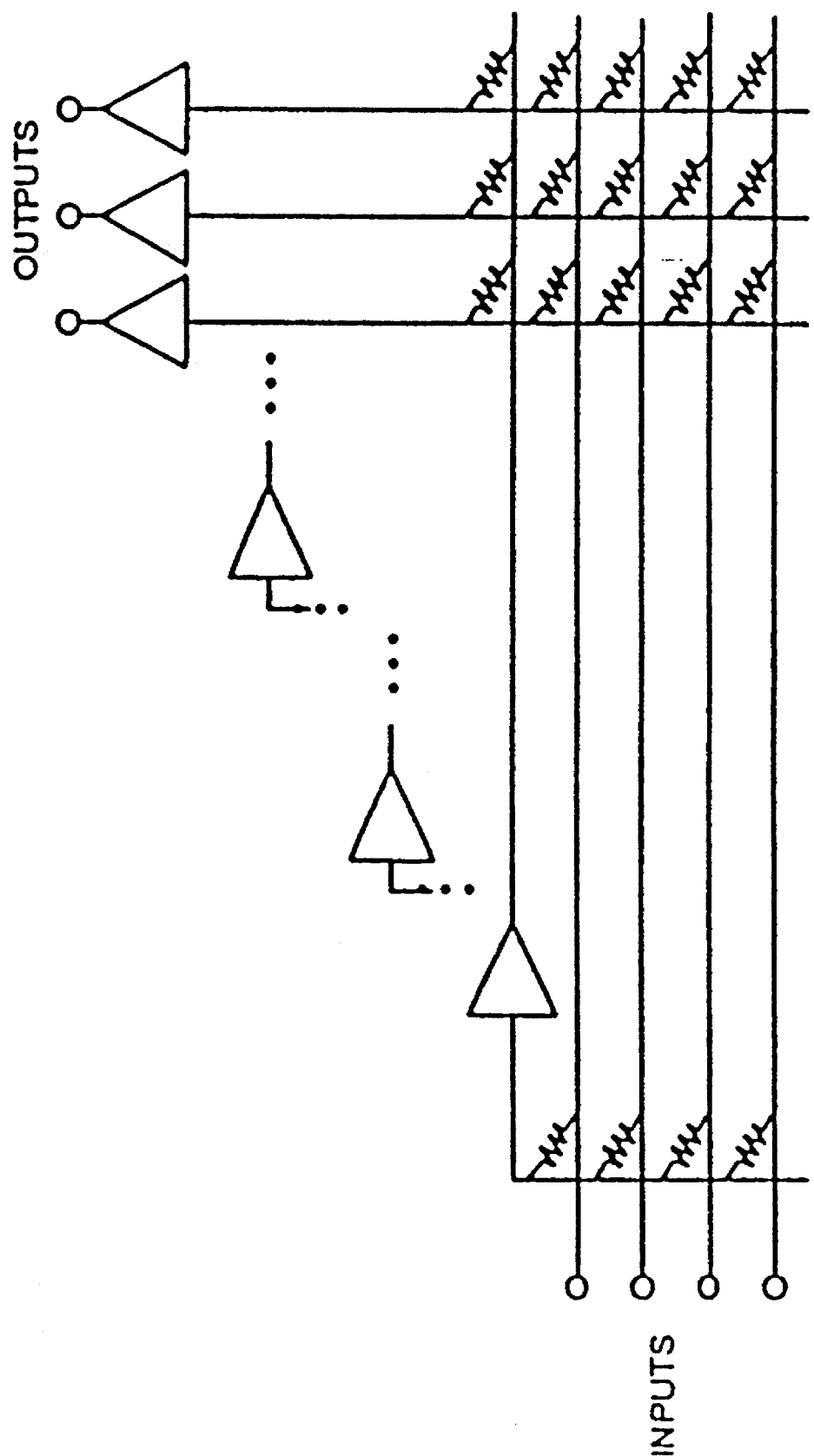
FIG. 4 is a schematic diagram of a cascade-backpropagation neural networks in accordance with the present invention.

In the CBNN, the network architecture also forms multiple hidden layers. Like the CCNN algorithm, the CBNN learning algorithm assigns hidden units one at a time to the network topology. The distinction between the two models lies in training methodology of the synaptic weight subset attached to the new allocated neuron. A schematic of the CBNN is shown in FIG. 4. Each new hidden unit receives a connection only from each of the network's original inputs and also from every pre-existing hidden unit. This hidden neuron fans-out and makes connections with each of the network's original outputs.

The learning algorithm for this problem is particularly simple and readily amenable to hardware implementations as compared to the CCNN. The network starts with a minimum configuration neural network with no hidden units. The input and output neurons are connected through a single synaptic block. The synaptic weights of this single-layer network can be calculated using a pseudo-inverse technique. These synaptic weights are then fixed. A new neuron is allocated to the network and small random weights are assigned to the connecting synapses. The backpropagation learning algorithm is applied to this single-neuron/single-hidden-layer problem. The weights are adjusted at every input pattern presentation according to the rule $$\omega_{ij}(t+1) = \omega_{ij}(t) + \eta \delta_j I_i$$

where $\omega_{ij}$ is the synaptic connection strength between node i and node j; the term $x_i$ is the output of the neuron i; $\eta$ is a gain term; and $\delta_j$ is the error signal. The error term, given by $$E = \frac{1}{2} \sum_i (t_i - x_i)^2$$

is monitored during training. If the error term falls below the minimum acceptable value, training stops. However, if the error reaches an asymptotic limit well above the minimum acceptable value after a few hundred training cycles, the synaptic weights linking this new neuron to the remainder of the network are frozen for the remainder of the training and a new neuron resource is allocated, making connections to the original network and to all other allocated hidden layers. By allocating a sufficient number of new neurons, the CBNN can eventually represent the targeted input-to-output linear/nonlinear transformation.

Figure 5:
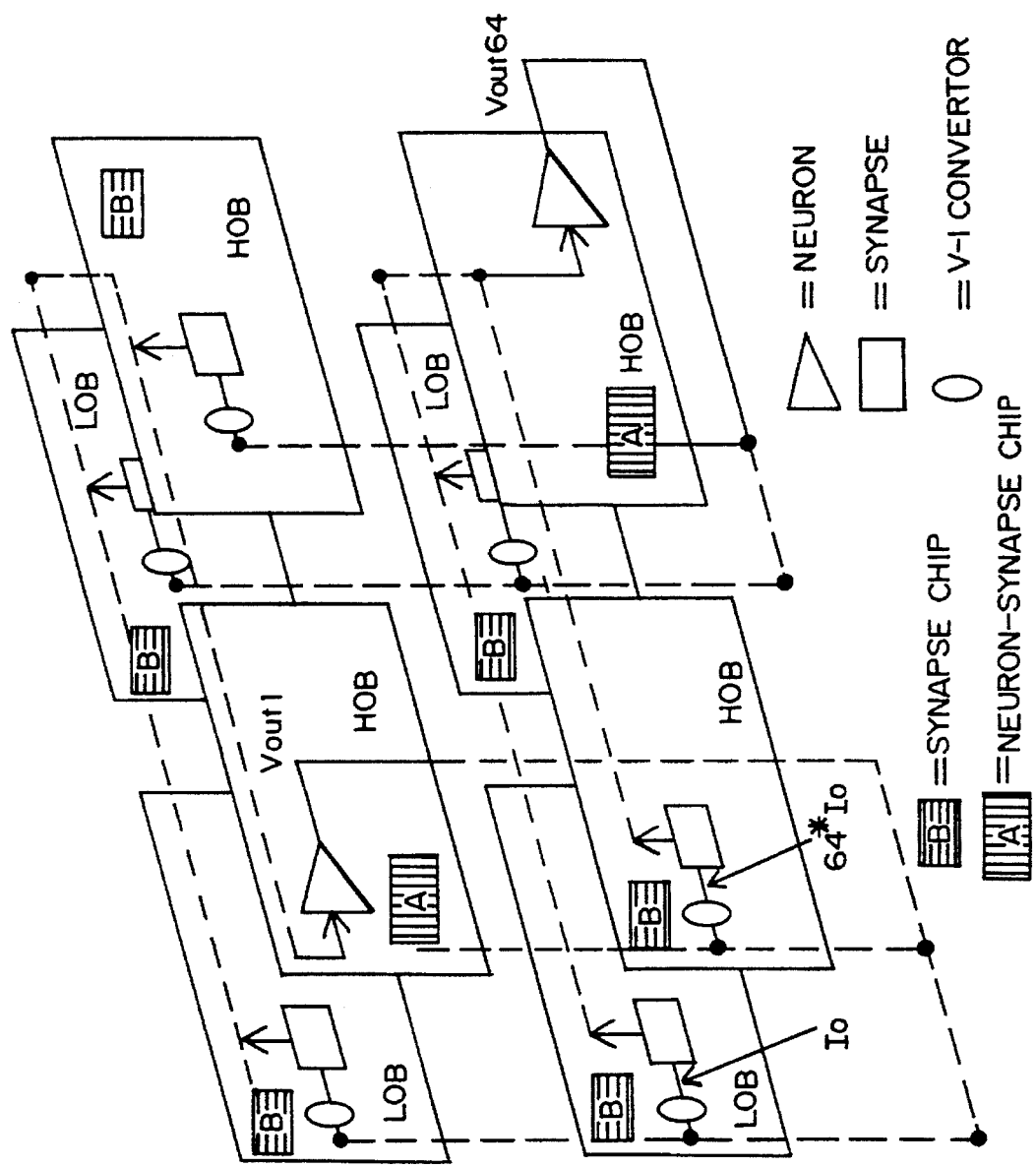
FIG. 5 is a schematic illustration of a piggyback chip stacking architecture of the invention.

The feedforward network for supervised learning implementing the CBNN architecture was constructed using a 7-bit (6-bit+sign) 32×32 synaptic array chip and a 32×31 composite synapse/neuron chip. For hardware based learning, it has been shown that a synaptic resolution greater than 10-bits is required. This requirement was met by cascading the synapse chips and composite neuron/synapse chips along the z direction. This architecture is shown schematically in FIG. 5. Chip B represents the synapse-only chip, and chip A is the hybrid neuron-synapse chip.

Increasing the synaptic dynamic range was achieved in the following way. A suitable bias voltage for all synaptic cells on chip B was determined and fixed. The corresponding input current $I_i$ per synaptic cell was measured. This ensures that the synaptic output current variation be over the range $-63\ I_i$, $+63\ I_i$. The bias voltage for the synapses on chip A was subsequently adjusted such that the corresponding input current was $I_j$ where $I_j = 64\ I_i$. Chip A having equally 7-bits of resolution results in an output current variation over the range $-63\ I_j$, $+63\ I_j$. As the respective synapses of the two stacked chips provide a current common to the output line, the synapse output is thus seen to vary over the range $-4095\ I_i$, $+4095\ I_i$ thereby providing a nominal 13-bit (12-bit+sign) synapse. However, practical considerations such as mismatch reduce the effective resolution to about 11 bits.

This neuroprocessor was successfully trained on the standard benchmarks, namely the XOR and parity problems. For example, the XOR transformation was learned with the allocation of 3 hidden neurons on the average.

Figure 6:
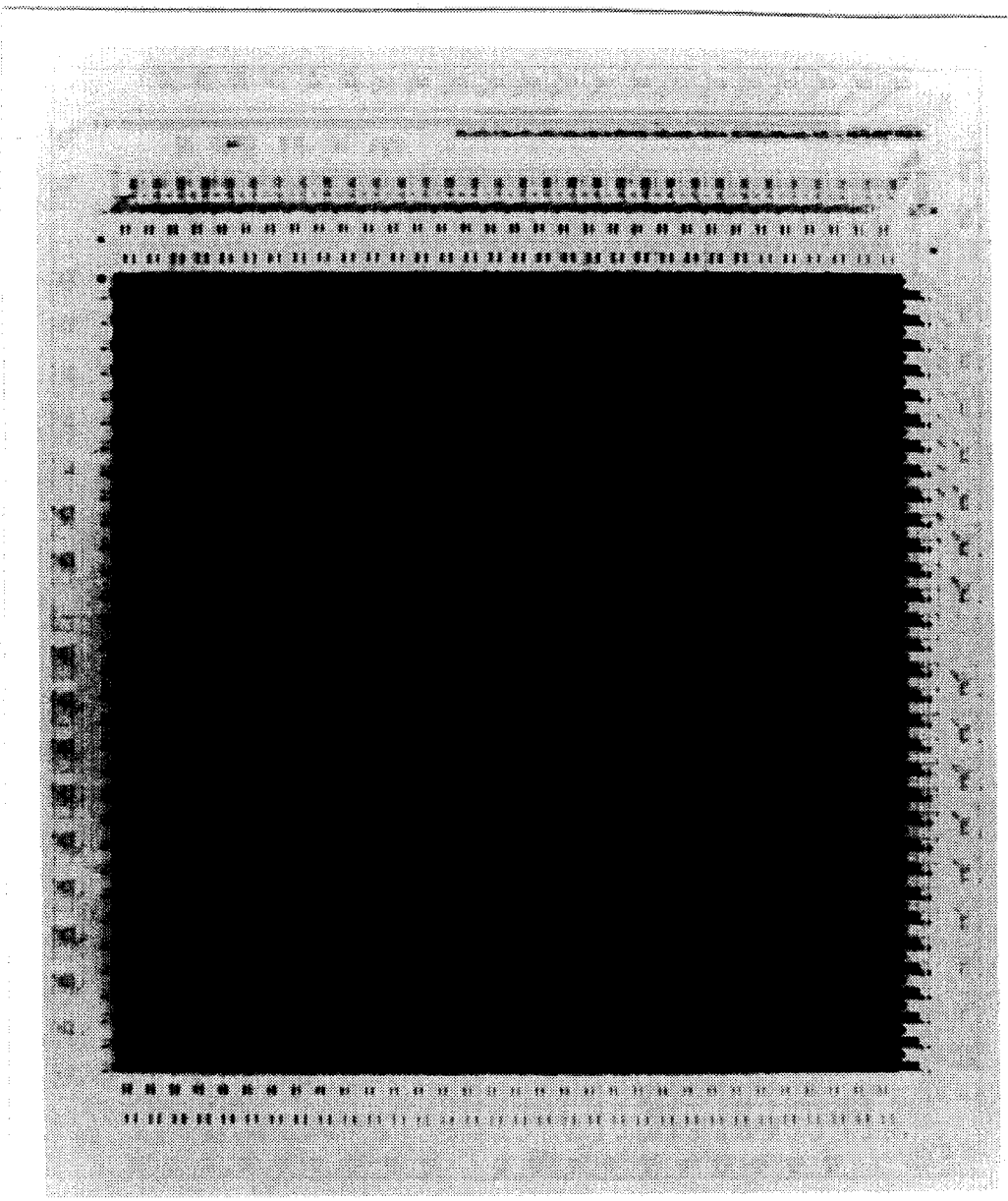
FIG. 6 is a photograph of the synapse-neuron integrated circuit chip of the invention.
Figure 7:
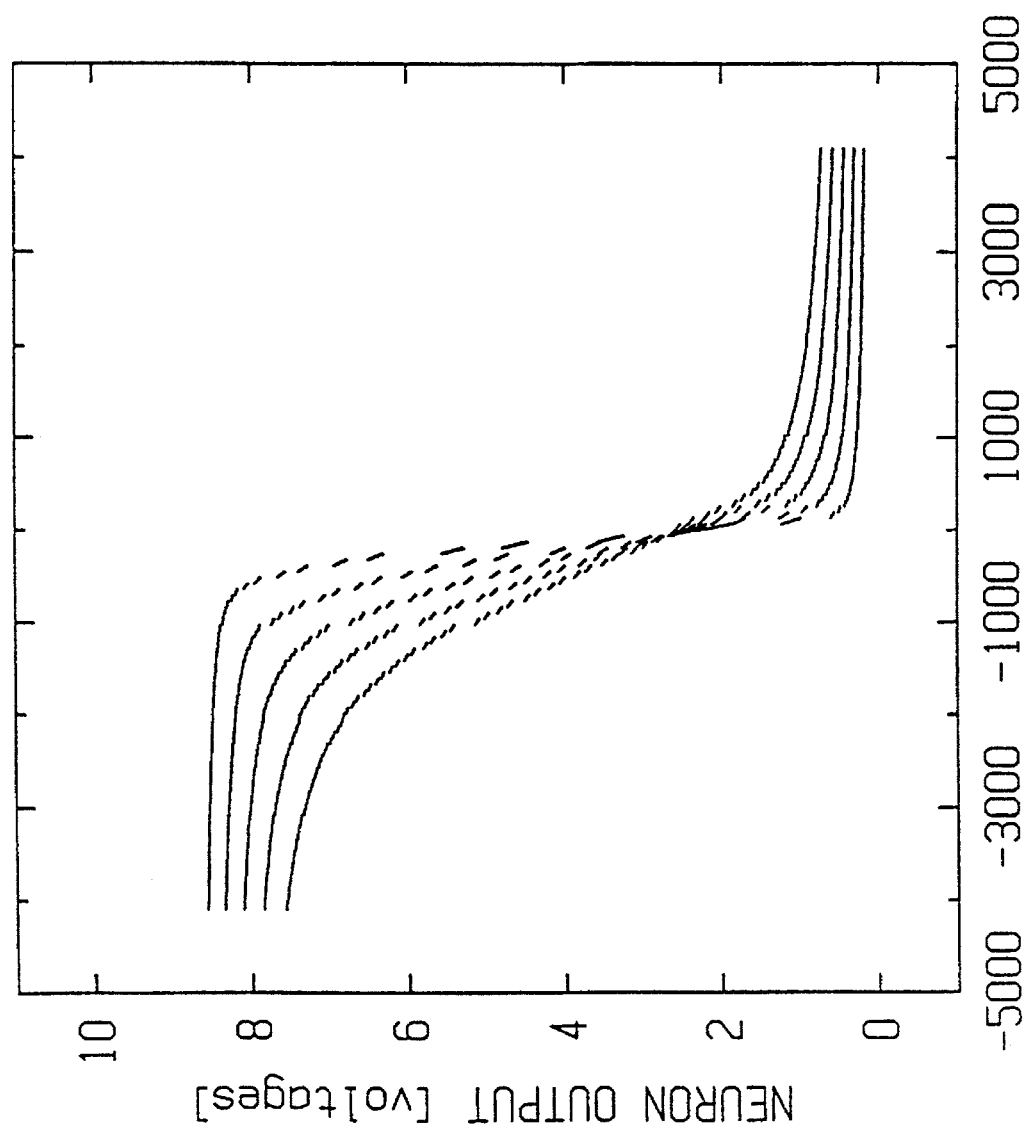
FIG. 7 is a graphical illustration of the measured transfer characteristics of a neuron showing the sigmoidal nature of the curve and variable gain.
Figure 8:
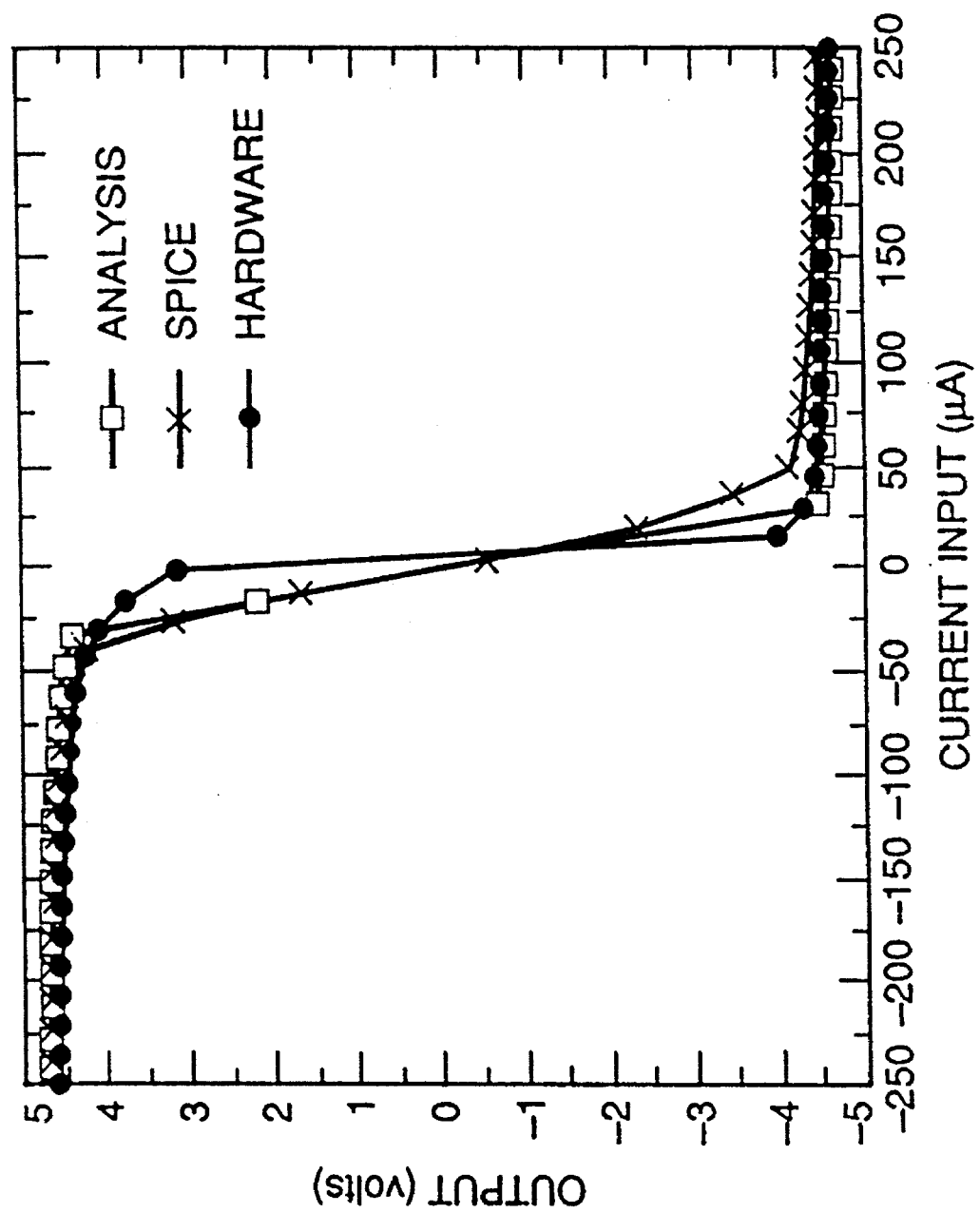
FIG. 8 is a graphical illustration of measured neuron characteristics compared with theory and SPICE simulation results.

This new scheme for obtaining 11 bits of synapse resolution is achieved by cascading a 7-bit resolution digital-analog hybrid synapse chip with a newly developed composite synapse-neuron chip (FIG. 6) consisting of a 32×31 matrix of electrically programmable, non-volatile, fully connected, 7-bit resolution synaptic weights (FIG. 2), and thirty two diagonally placed, variable-gain neurons with sigmoidal transfer characteristics (FIG. 7). The neuron characteristics derived by circuit analysis and obtained by SPICE simulation show a very good match with those measured in hardware (FIG. 8). This fully connected network interfaced to a PC is configured in a feedforward architecture by nulling the feedback and unused synapse transconductances. The hardware is then used for learning the solution to the "exclusive or" (XOR) problem with our new learning algorithm called cascade backpropagation (CBNN) that has useful features of both BP and CC algorithms. The hardware indeed learns the solution by presenting four training examples (0,0; 0,1; 1,0; and 1,1) to it and iteratively adjusting the weights.

THE INVENTIVE CHIPS

Figure 9:
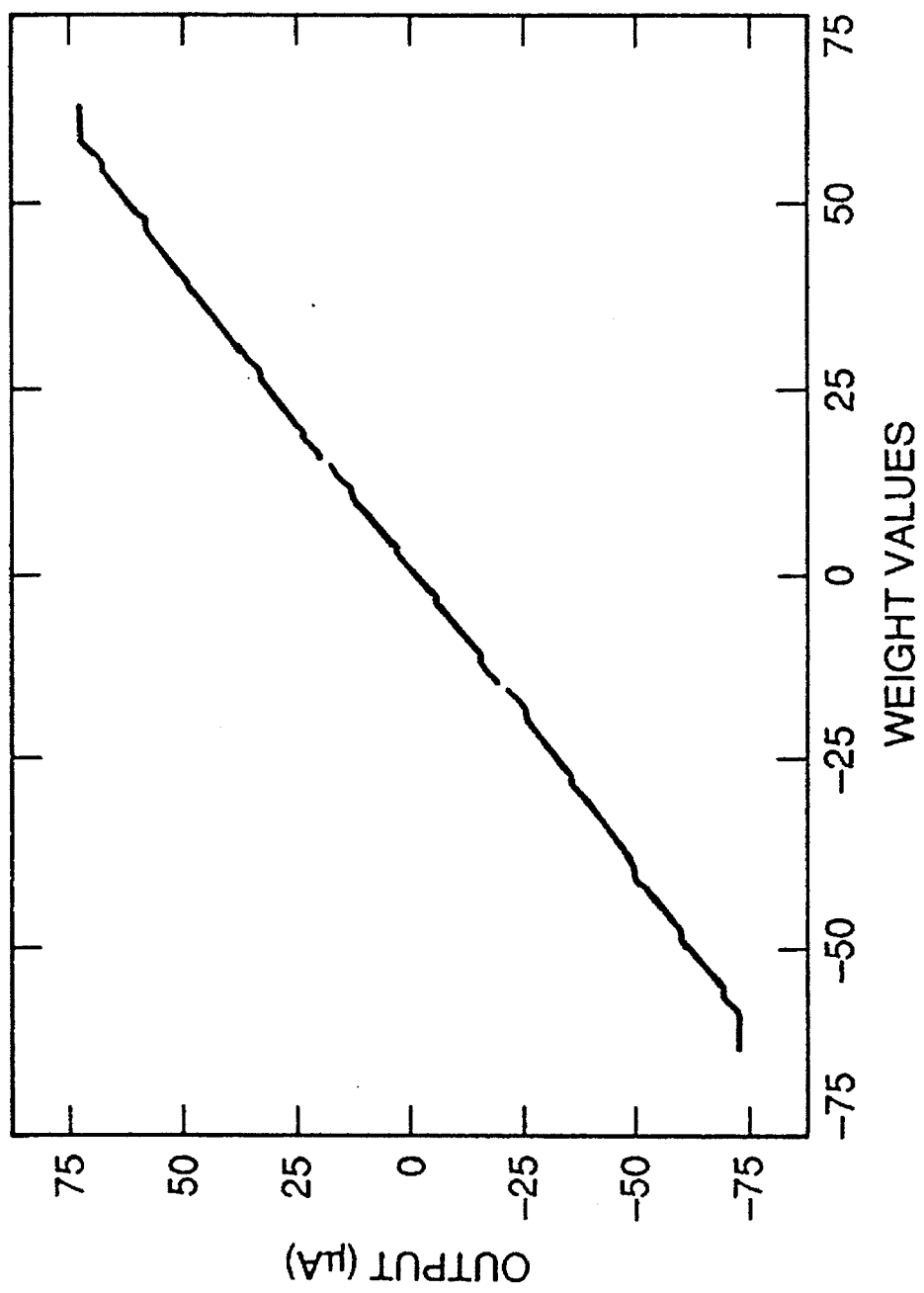
FIG. 9 is a graphical illustration of the characteristics of a synapse showing the linearity of behavior.

SYNAPSE DESIGN: Implemented with a 2-μm feature size CMOS VLSI process, each synapse in the two chips contains a two-quadrant multiplying digital-to-analog converter (DAC) based on a cascode current mirror design that achieves high linearity of current in its multiplying operation (FIG. 9). Externally addressable multi-bit static latches are incorporated to program the required weights into the synapse. Additionally, a current steering circuit allows bipolar current output (positive for excitation, negative for inhibition), and hence a single current summing node, where an algebraic sum of synapse output currents is likely to be much less than the sum of their absolute magnitudes.

Figure 10:
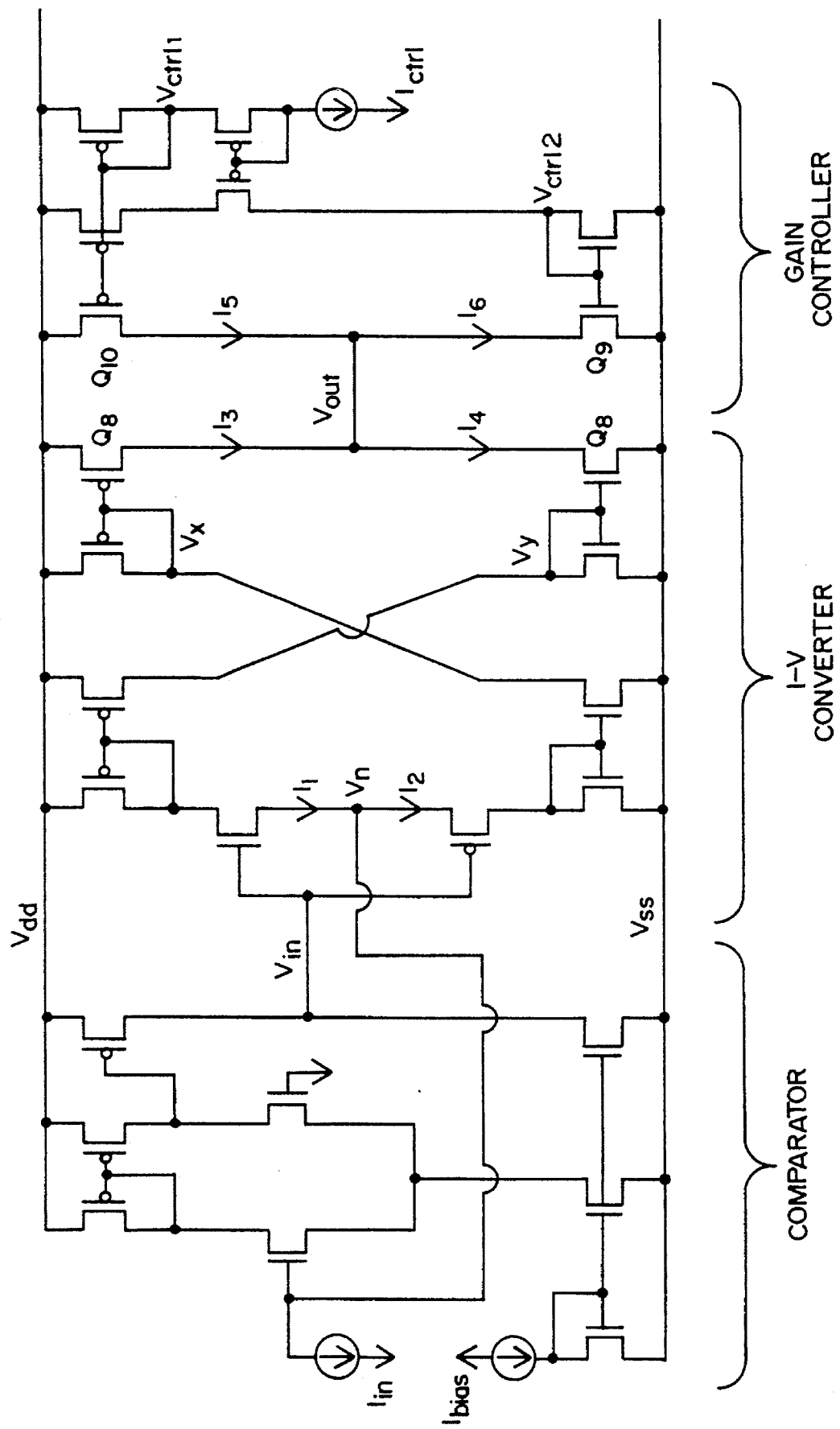
FIG. 10 is a schematic circuit diagram of a wide range neuron.

NEURON DESIGN: An operational amplifier implements the required neuron transfer characteristics of sigmoidal function from its input current to its output voltage. The neuron circuit (FIG. 10) comprises three functional blocks. The first block consists of a comparator circuit that provides the thresholding sigmoidal function and compares the input current to a reference. The second block performs the currents-to-voltage conversion whereas, the third block has a gain controller to modify the amplifier gain, thereby changing the sigmoidal slope. This feature is important in neural networks for simulated annealing function. The design offers four distinct regions in neuron characteristics. Regions 1 and 4 are the flat regions where the output nearly saturates for larger magnitudes of the input currents for the positive and negative values of the input current, respectively, and the regions 2 and 3 are the linear parts of the curve, again for positive and negative values of the input current. A smooth transition into successive regions allows for a monotonically increasing sigmoidal curve as input current to the neuron increases from a large negative value to a large positive value, and the output voltage is bounded by the rail voltages.

CONCLUSIONS

The building block approach to the construction of fully parallel neural networks allows the implementation of networks of various sizes and architectures using only a small set of custom VLSI chip designs. This has made it possible to rapidly prototype application-specific neuroprocessors without the need for extensive VLSI design and fabrication. A critical issue however is the ease of implementing on-line learning with chip-in-the-loop approaches. In our approaches, we have been able to configure hardware to provide 11 bits of dynamic range or better. Consequently, it has become possible for the first time to implement analog neural networks with the capability for supervised learning.

Having thus described a preferred embodiment of our invention, what is claimed is:

1. A neuroprocessor comprising at least one synapse chip formed as a matrix of synapse nodes and comprising a plurality of voltage inputs and a plurality of current outputs, each such synapse node comprising a voltage-to-current converter, a two-quadrant multiplying digital-to-analog converter, a plurality of static weighting latches and a current steering circuit;

a synapse-neuron composite chip comprising one said synapse chip in which a diagonal line of synapse nodes within said matrix of synapse nodes is replaced by a plurality of neurons;

a thresholding comparator having a sigmoidal function to input currents, a current-to-voltage converter and a variable-gain voltage amplifier circuit for adjusting said sigmoidal function;

wherein said synapse chip and said synapse-neuron composite chip are connected in a parallel cascaded configuration wherein output current variation of the synapse-neuron composite chip is added to an output current variation of the synapse chip to provide a combined resolution commensurate with a sum of resolutions of both chips.

2. The neuroprocessor as claimed in claim 1 wherein said synapse chip and synapse-neuron composite chip are implemented in VLSI circuits.

3. The neuroprocessor as claimed in claim 1 wherein said synapse-neuron composite chip comprises a modified form of said synapse integrated circuit chip wherein a diagonal line of synapse nodes in said matrix of synapse nodes is replaced with a plurality of neurons in Mid synapse-neuron composite chip.

4. The neuroprocessor as claimed in claim 1 wherein each of said neurons comprises:

a thresholding comparator having a sigmoidal function to input currents, a current-to-voltage converter and a variable gain voltage amplifier circuit for adjusting said sigmoidal function.

5. The neuroprocessor as claimed in claim 1 wherein said synapse-neuron composite chip is configured for full connectivity wherein each neuron therein is connected to every other neuron including itself.

* * * * *